United States Patent
Chiu

(12) 
(10) Patent No.: US 11,525,088 B1
(45) Date of Patent: Dec. 13, 2022

(54) COMPOSITION CAPABLE OF FIRE PREVENTION, EXPLOSION PREVENTION AND HEAT INSULATION AND MANUFACTURING METHOD THEREOF

(71) Applicant: Long-Ann Chiu, New Taipei (TW)

(72) Inventor: Long-Ann Chiu, New Taipei (TW)

( * ) Notice: Subject to any disclaimer, the term of this patent is extended or adjusted under 35 U.S.C. 154(b) by 0 days.

(21) Appl. No.: 17/342,430

(22) Filed: Jun. 8, 2021

(51) Int. Cl.
*C09K 21/02* (2006.01)
*C09K 21/14* (2006.01)

(52) U.S. Cl.
CPC .............. *C09K 21/02* (2013.01); *C09K 21/14* (2013.01)

(58) Field of Classification Search
None
See application file for complete search history.

(56) References Cited

U.S. PATENT DOCUMENTS

| | | | |
|---|---|---|---|
| 2007/0191519 A1* | 8/2007 | Jiao | C09K 21/14 524/537 |
| 2008/0063875 A1* | 3/2008 | Robinson | B32B 15/02 428/446 |

* cited by examiner

*Primary Examiner* — Joseph D Anthony
(74) *Attorney, Agent, or Firm* — Che-Yang Chen; Law Office of Michael Chen

(57) ABSTRACT

A composition capable of fire prevention, explosion prevention and heat insulation and a manufacturing method thereof are disclosed. The composition comprises the materials of 10~12 parts of weight of kaolin; 1~2 parts of weight of glass fiber; 7~10 parts of weight of quartz sand; 7~10 parts of weight of organic silica gel; 3~5 parts of weight of inorganic silica gel; 1~2 parts of weight of dimethyl tert-butylperoxyhexane; 3~5 parts of weight of platinum; 20~40 parts of weight of aluminum hydroxide; 1~5 parts of weight of magnesium hydroxide; 1~2 parts of weight of marble powder; 3~5 parts of weight of carbon powder; 2~4 parts of weight of glue; 1~2 parts of weight of zinc stearate solvent; 1~2 parts of weight of leveling agent; 1~2 parts of weight of ethylene silicone oil; 0.05~0.1 parts of weight of azobisisobutyronitrile foaming agent; and 0.05~0.1 parts of weight of polyether-modified polysiloxane antifoaming agent.

18 Claims, No Drawings

COMPOSITION CAPABLE OF FIRE PREVENTION, EXPLOSION PREVENTION AND HEAT INSULATION AND MANUFACTURING METHOD THEREOF

FIELD OF THE INVENTION

The present invention relates to a composition of building materials and manufacturing method thereof. More particularly, the present invention relates to a composition capable of fire prevention, explosion prevention and heat insulation and manufacturing method thereof.

BACKGROUND OF THE INVENTION

Due to the concentration of urban population and the rapid increase in the number of people per unit area, new high-rise buildings to meet the needs of housing are ongoing construction work in various cities. Also, due to the increase in height and density of tall buildings, the importance of building fire protection is highlighted. In the design of high-rise buildings, in addition to fire-fighting equipment, the most important thing is the use of fireproof building materials.

Fireproof building materials refer to construction or decoration materials with a certain level or above of fireproof performance, which can be divided into the following three types: non-combustible materials, such as concrete, bricks or hollow bricks; refractory materials, such as wood wool cement boards, fire-resistant gypsum boards, etc.; and flame-resistant materials, such as flame-resistant plywood, flame-resistant fiberboard, flame-resistant plastic board, gypsum board, etc. Although the above materials have better fire resistance, they are easily deformed after being heated to cause bursting. In addition, fireproof building materials should also have a certain thermal insulation function (lower heat conduction), so as to avoid the heat source on one side of the building material from triggering the high temperature of the flammable materials on the other side when a fire occurs.

New types of fireproof building materials have been exposed in many prior arts, such as CN106348719A, CN107417167A, CN109536029A, etc. However, the use of special materials, especially rare metals, as part of the raw materials to provide better fire protection, explosion protection and heat insulation functions have not been proposed. The present invention is a brand-new composition with fire prevention, explosion prevention and heat insulation functions mixed with rare metals and its manufacturing method after many years of research and development. The composition can be used as a fireproof building material or used in other scenes that require fire and heat insulation.

SUMMARY OF THE INVENTION

The present invention will now be described more specifically with reference to the following embodiments.

In order to meet the aforementioned needs, a composition capable of fire prevention, explosion prevention and heat insulation is disclosed. The composition comprises materials of 10~12 parts by weight of kaolin; 1~2 parts by weight of glass fiber; 7~10 parts by weight of quartz sand; 7~10 parts by weight of organic silica gel, 3~5 parts by weight of inorganic silica gel; 1~2 parts by weight of dimethyl tert-butylperoxyhexane; 3~5 parts by weight of platinum; 20~40 parts by weight of aluminum hydroxide; 1~5 parts by weight of magnesium hydroxide; 1~2 parts by weight of marble powder; 3~5 parts by weight of carbon powder; 2~4 parts by weight of glue; 1~2 parts by weight of zinc stearate solvent; 1~2 parts by weight of leveling agent; 1~2 parts by weight of ethylene silicone oil; 0.05~0.1 part by weight of azobisisobutyronitrile foaming agent; and 0.05~0.1 part by weight of polyether-modified polysiloxane antifoaming agent.

According to the present invention, the glue may be Polyurethane (PU) glue or epoxy resin.

According to the present invention, the leveling agent may be dipotassium silicone oil or benzyl resin.

A manufacturing method of the composition capable of fire prevention, explosion prevention and heat insulation is also disclosed. The manufacturing method comprises steps of: a) providing organic silica gel, inorganic silica gel, platinum and azobisisobutyronitrile foaming agent according to the above formula, evenly mixing them, and heating up the temperature to 80~120° C. to maintain 30 minutes before cooling down to 25~27° C. to keep 24 hours to form a base material; b) mixing the base material and ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at 90~120° C. during the whole process; c) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step b) to mix for 20 minutes, wherein the temperature is kept at 90~120° C. during the whole process; and d) molding by injection or extrusion method after maintaining the mixture formed in step c) at 130~190° C. for 10 minutes.

According to the present invention, step a) is processed by an internal mixer or an open mixer.

The present invention uses platinum as one of the key materials of the composition, so that the composition has better explosion proof and heat insulation functions in addition to the fireproof function. The composition can be used as a fireproof building material or used in other scenes that require fire and heat insulation.

BRIEF DESCRIPTION OF THE DRAWINGS

No drawing is shown in the present invention.

DETAILED DESCRIPTION OF THE PREFERRED EMBODIMENTS

The following will clearly and completely describe the technical solutions in the embodiments of the present invention. Obviously, the described embodiments are only a part of the embodiments of the present invention, rather than all the embodiments. Based on the embodiments of the present invention, all other embodiments obtained by those skilled in the art without creative work are all belong to the scope of protection of the present invention.

Embodiment 1

A composition capable of fire prevention, explosion prevention and heat insulation in the embodiment comprises 10 parts by weight of kaolin; 1 part by weight of glass fiber; 7 parts by weight of quartz sand; 7 parts by weight of organic silica gel; 3 parts by weight of inorganic silica gel; 1 part by weight of dimethyl tert-butylperoxyhexane; 3 parts by weight of platinum; 20 parts by weight of aluminum hydroxide; 1 part by weight of magnesium hydroxide; 1 part by weight of marble powder; 3 parts by weight of carbon powder; 2 parts by weight of glue; 1 part by weight of zinc stearate solvent; 1 part by weight of leveling agent; 1 part by weight of ethylene silicone oil; 0.05 part by weight of azobisisobutyronitrile foaming agent; and 0.05 part by weight of polyether-modified polysiloxane antifoaming agent.

In practice, the glue can be PU glue or epoxy resin. The leveling agent can be dipotassium silicone oil or benzyl resin.

A manufacturing method of the composition capable of fire prevention, explosion prevention and heat insulation comprises steps of: step 1) providing organic silica gel inorganic silica gel, platinum and azobisisobutyronitrile foaming agent according to the above formula, evenly mixing them, and heating up the temperature to 80° C. to maintain 30 minutes before cooling down to room temperature (25~27° C.) to keep 24 hours to form a base material; step 2) mixing the base material with ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at around 90° C. during the whole process; step 3) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step 2) to mix for 20 minutes, wherein the temperature is kept at around 90° C. during the whole process; and step 4), molding by injection or extrusion method after maintaining the mixture formed in step 3) at around 130° C. for 10 minutes. In practice, step 1) may be processed by an internal mixer or an open mixer.

Embodiment 2

A composition capable of fire prevention, explosion prevention and heat insulation in the embodiment comprises 11 parts by weight of kaolin; 1.5 parts by weight of glass fiber; 8 parts by weight of quartz sand; 8 parts by weight of organic silica gel; 4 parts by weight of inorganic silica gel; 1.5 parts by weight of dimethyl tert-butylperoxyhexane; 4 parts by weight of platinum; 30 parts by weight of aluminum hydroxide; 3 parts by weight of magnesium hydroxide; 1.5 parts by weight of marble powder; 4 parts by weight of carbon powder; 3 parts by weight of glue; 1.5 parts by weight of zinc stearate solvent; 1.5 parts by weight of leveling agent; 1.5 parts by weight of ethylene silicone oil; 0.07 part by weight of azobisisobutyronitrile foaming agent; and 0.07 part by weight of polyether-modified polysiloxane antifoaming agent.

In practice, the glue can be PU glue or epoxy resin. The leveling agent may be dipotassium silicone oil or benzyl resin.

A manufacturing method of the composition capable of fire prevention, explosion prevention and heat insulation comprises steps of: step 1) providing organic silica gel, inorganic silica gel, platinum and azobisisobutyronitrile foaming agent according to the above formula, evenly mixing them, and heating up the temperature to 100° C. to maintain 30 minutes before cooling down to room temperature (25~27° C.) to keep 24 hours to form a base material; step 2) mixing the base material with ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at around 100° C. during the whole process; step 3) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step 2) to mix for 20 minutes, wherein the temperature is kept at around 100° C. during the whole process; and step 4), molding by injection or extrusion method after maintaining the mixture formed in step 3) at around 160° C. for 10 minutes. In practice, step 1) may be processed by an internal mixer or an open mixer.

Embodiment 3

A composition capable of fire prevention, explosion prevention and heat insulation in the embodiment comprises 12 parts by weight of kaolin; 2 parts by weight of glass fiber; 10 parts by weight of quartz sand; 10 parts by weight of organic silica gel; 5 parts by weight of inorganic silica gel; 2 parts by weight of dimethyl tert-butylperoxyhexane; 5 parts by weight of platinum; 40 parts by weight of aluminum hydroxide; 5 parts by weight of magnesium hydroxide; 2 parts by weight of marble powder; 5 parts by weight of carbon powder; 4 parts by weight of glue; 2 parts by weight of zinc stearate solvent; 2 parts by weight of leveling agent; 2 parts by weight of ethylene silicone oil; 0.1 part by weight of azobisisobutyronitrile foaming agent; and 0.1 part by weight of polyether-modified polysiloxane antifoaming agent.

In practice, the glue may be PI glue or epoxy resin. The leveling agent may be dipotassium silicone oil or benzyl resin.

A manufacturing method of the composition capable of fire prevention, explosion prevention and heat insulation comprises steps of: step 1) providing organic silica gel inorganic silica gel platinum and azobisisobutyronitrile foaming agent according to the above formula, evenly mixing them, and heating up the temperature to 120° C. to maintain 30 minutes before cooling down to room temperature (25~27° C.) to keep 24 hours to form a base material; step 2) mixing the base material with ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at around 120° C. during the whole process; step 3) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step 2) to mix for 20 minutes, wherein the temperature is kept at around 120° C. during the whole process; and step 4), molding by injection or extrusion method after maintaining the mixture formed in step 3) at around 190° C. for 10 minutes. In practice, step 1) may be processed by an internal mixer or an open mixer.

According to the spirit of the present invention, a composition capable of fire prevention, explosion prevention and heat insulation may comprise the materials of: 10~12 parts by weight of kaolin; 1~2 parts by weight of glass fiber; 7~10 parts by weight of quartz sand; 7~10 parts by weight of organic silica gel; 3~5 parts by weight of inorganic silica gel; 1~2 parts by weight of dimethyl tert-butylperoxyhexane; 3~5 parts by weight of platinum; 20~40 parts by weight of aluminum hydroxide; 1~5 parts by weight of magnesium hydroxide; 1~2 parts by weight of marble powder; 3~5 parts by weight of carbon powder; 2~4 parts by weight of glue; 1~2 parts by weight of zinc stearate solvent; 1~2 parts by weight of leveling agent; 1~2 parts by weight of ethylene silicone oil; 0.05~0.1 part by weight of azobisisobutyronitrile foaming agent; and 0.05~0.1 part by weight of polyether-modified polysiloxane antifoaming agent.

Relatively, a manufacturing method of the aforementioned composition may comprises steps of step 1), providing organic silica gel, inorganic silica gel, platinum and azobisisobutyronitrile foaming agent according to the above formula, evenly mixing them, and heating up the temperature to 80~120° C. to maintain 30 minutes before cooling down to 25~27° C. to keep 24 hours to form a base material; step 2) mixing the base material and ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at 90~120° C. during the whole process; step 3) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step b) to mix for 20 minutes, wherein the temperature is kept at 90~120° C. during the whole process; and step 4) molding by injection or extrusion method after maintaining the mixture formed in step c) at 130~190° C. for 10 minutes.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A composition capable of fire prevention, explosion prevention and heat insulation comprising the materials of 10~12 parts by weight of kaolin; 1~2 parts by weight of glass fiber; 7~10 parts by weight of quartz sand; 7~10 parts by weight of organic silica gel; 3~5 parts by weight of inorganic silica gel; 1~2 parts by weight of dimethyl tert-butylperoxyhexane; 3~5 parts by weight of platinum; 20~40 parts by weight of aluminum hydroxide; 1~5 parts by weight of magnesium hydroxide; 1~2 parts by weight of marble powder; 3~5 parts by weight of carbon powder; 2~4 parts by weight of glue; 1~2 parts by weight of zinc stearate solvent; 1~2 parts by weight of leveling agent; 1~2 parts by weight of ethylene silicone oil; 0.05~0.1 parts by weight of azobisisobutyronitrile foaming agent; and 0.05~0.1 parts by weight of polyether-modified polysiloxane antifoaming agent.

2. The composition capable of fire prevention, explosion prevention and heat insulation according to claim 1, wherein the glue is Polyurethane (PU) glue or epoxy resin.

3. The composition capable of fire prevention, explosion prevention and heat insulation according to claim 1, wherein the leveling agent is benzyl resin.

4. The composition capable of fire prevention, explosion prevention and heat insulation according to claim 1, wherein kaolin is 10 parts by weight; glass fiber is 1 part by weight; quartz sand is 7 parts by weight; organic silica gel is 7 parts by weight; inorganic silica gel is 3 parts by weight; dimethyl tert-butylperoxyhexane is 1 part by weight; platinum is 3 parts by weight; aluminum hydroxide is 20 parts by weight; magnesium hydroxide is 1 part by weight; marble powder is 1 part by weight; carbon powder is 3 parts by weight; glue is 2 parts by weight; zinc stearate solvent is 1 part by weight; leveling agent is 1 part by weight; ethylene silicone oil is 1 part by weight; azobisisobutyronitrile foaming agent is 0.05 part by weight; and polyether-modified polysiloxane antifoaming agent is 0.05 part by weight.

5. The composition capable of fire prevention, explosion prevention and heat insulation according to claim 1, wherein kaolin is 12 parts by weight; glass fiber is 2 parts by weight; quartz sand is 10 parts by weight; organic silica gel is 10 parts by weight; inorganic silica gel is 5 parts by weight; dimethyl tert-butylperoxyhexane is 2 parts by weight; platinum is 5 parts by weight; aluminum hydroxide is 40 parts by weight; magnesium hydroxide is 5 parts by weight; marble powder is 2 parts by weight; carbon powder is 5 parts by weight; glue is 4 parts by weight; zinc stearate solvent is 2 parts by weight; leveling agent is 2 parts by weight; ethylene silicone oil is 2 parts by weight; azobisisobutyronitrile foaming agent is 0.1 part by weight; and polyether-modified polysiloxane antifoaming agent is 0.1 part by weight.

6. The composition capable of fire prevention, explosion prevention and heat insulation according to claim 1, wherein kaolin 11 is parts by weight; glass fiber 1.5 is parts by weight; quartz sand is 8 parts by weight; organic silica gel is 8 parts by weight; inorganic silica gel is 4 parts by weight; dimethyl tert-butylperoxyhexane is 1.5 parts by weight; platinum is 4 parts by weight; aluminum hydroxide is 30 parts by weight; magnesium hydroxide is 3 parts by weight; marble powder is 1.5 parts by weight; carbon powder is 4 parts by weight; glue is 3 parts by weight; zinc stearate solvent is 1.5 parts by weight; leveling agent is 1.5 parts by weight; ethylene silicone oil is 1.5 parts by weight; azobisisobutyronitrile foaming agent is 0.07 part by weight; and polyether-modified polysiloxane antifoaming agent is 0.07 part by weight.

7. A manufacturing method of the composition capable of fire prevention, explosion prevention and heat insulation according to claim 1, comprising steps of:
   a) providing organic silica gel, inorganic silica gel, platinum and azobisisobutyronitrile foaming agent according to the above formula, evenly mixing them, and heating up the temperature to 80~120° C. to maintain 30 minutes before cooling down to 25~27° C. to keep 24 hours to form a base material;
   b) mixing the base material and ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at 90~120° C. during the whole process;
   c) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step b) to mix for 20 minutes, wherein the temperature is kept at 90~420° C. during the whole process; and
   d) molding by injection or extrusion method after maintaining the mixture formed in step c) at 130~190° C. for 10 minutes.

8. The manufacturing method according to claim 7, wherein step a) is processed by an internal mixer or an open mixer.

9. A manufacturing method of the composition capable of fire prevention, explosion prevention and heat insulation according to claim 2, comprising steps of:

a) providing organic silica gel, inorganic silica gel, platinum and azobisisobutyronitrile foaming agent according to the above formula, evenly mixing them, and heating up the temperature to 80~120° C. to maintain 30 minutes before cooling down to 25~27° C. to keep 24 hours to form a base material;

b) mixing the base material and ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at 90~120° C. during the whole process;

c) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step b) to mix for 20 minutes, wherein the temperature is kept at 90~420° C. during the whole process; and d) molding by injection or extrusion method after maintaining the mixture formed in step c) at 130~190° C. for 10 minutes.

10. The manufacturing method according to claim 9, wherein step a) is processed by an internal mixer or an open mixer.

11. A manufacturing method of the composition capable of fire prevention, explosion prevention and heat insulation according to claim 3, comprising steps of:

a) providing organic silica gel, inorganic silica gel, platinum and azobisisobutyronitrile foaming agent according to the above formula, evenly mixing them, and heating up the temperature to 80~120° C. to maintain 30 minutes before cooling down to 25~27° C. to keep 24 hours to form a base material;

b) mixing the base material and ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at 90~120° C. during the whole process;

c) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step b) to mix for 20 minutes, wherein the temperature is kept at 90~420° C. during the whole process; and d) molding by injection or extrusion method after maintaining the mixture formed in step c) at 130~190° C. for 10 minutes.

12. The manufacturing method according to claim 11, wherein step a) is processed by an internal mixer or an open mixer.

13. A manufacturing method of the composition capable of fire prevention, explosion prevention and heat insulation according to claim 4, comprising steps of:

a) providing organic silica gel, inorganic silica gel, platinum and azobisisobutyronitrile foaming agent according to the above formula, evenly mixing them, and heating up the temperature to 80~120° C. to maintain 30 minutes before cooling down to 25~27° C. to keep 24 hours to form a base material;

b) mixing the base material and ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at 90~120° C. during the whole process;

c) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step b) to mix for 20 minutes, wherein the temperature is kept at 90~420° C. during the whole process; and d) molding by injection or extrusion method after maintaining the mixture formed in step c) at 130~190° C. for 10 minutes.

14. The manufacturing method according to claim 13, wherein step a) is processed by an internal mixer or an open mixer.

15. A manufacturing method of the composition capable of fire prevention, explosion prevention and heat insulation according to claim 5, comprising steps of:

a) providing organic silica gel, inorganic silica gel, platinum and azobisisobutyronitrile foaming agent according to the above formula, evenly mixing them, and heating up the temperature to 80~120° C. to maintain 30 minutes before cooling down to 25~27° C. to keep 24 hours to form a base material;

b) mixing the base material and ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at 90~120° C. during the whole process;

c) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step b) to mix for 20 minutes, wherein the temperature is kept at 90~420° C. during the whole process; and d) molding by injection or extrusion method after maintaining the mixture formed in step c) at 130~190° C. for 10 minutes.

16. The manufacturing method according to claim 15, wherein step a) is processed by an internal mixer or an open mixer.

17. A manufacturing method of the composition capable of fire prevention, explosion prevention and heat insulation according to claim 6, comprising steps of:

a) providing organic silica gel, inorganic silica gel, platinum and azobisisobutyronitrile foaming agent according to the above formula, evenly mixing them, and heating up the temperature to 80~120° C. to maintain 30 minutes before cooling down to 25~27° C. to keep 24 hours to form a base material;

b) mixing the base material and ethylene silicone oil provided in the formula for 20 minutes, and then adding marble powder, carbon powder, aluminum hydroxide and magnesium hydroxide provided in the formula to the mixed base material to mix for 40 minutes, wherein the temperature is kept at 90~120° C. during the whole process;

c) adding kaolin, quartz sand, glass fiber, zinc stearate solvent, leveling agent, polyether-modified polysiloxane antifoaming agent, glue and dimethyl tert-butylperoxyhexane provided in the formula to the mixture formed in step b) to mix for 20 minutes, wherein the temperature is kept at 90~420° C. during the whole process; and d) molding by injection or extrusion method after maintaining the mixture formed in step c) at 130~190° C. for 10 minutes.

18. The manufacturing method according to claim 17, wherein step a) is processed by an internal mixer or an open mixer.

\* \* \* \* \*